United States Patent Office 3,143,217
Patented Aug. 4, 1964

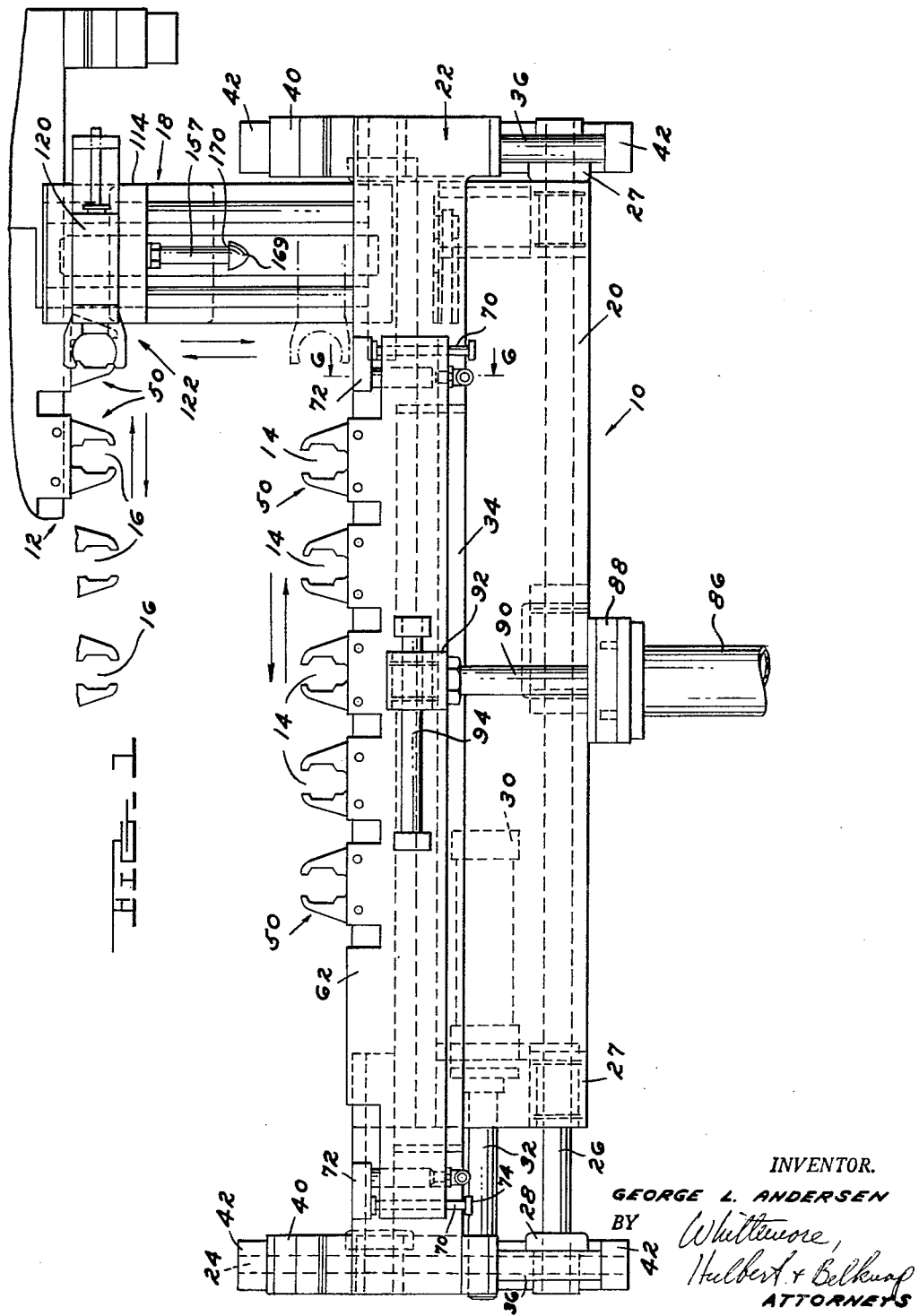

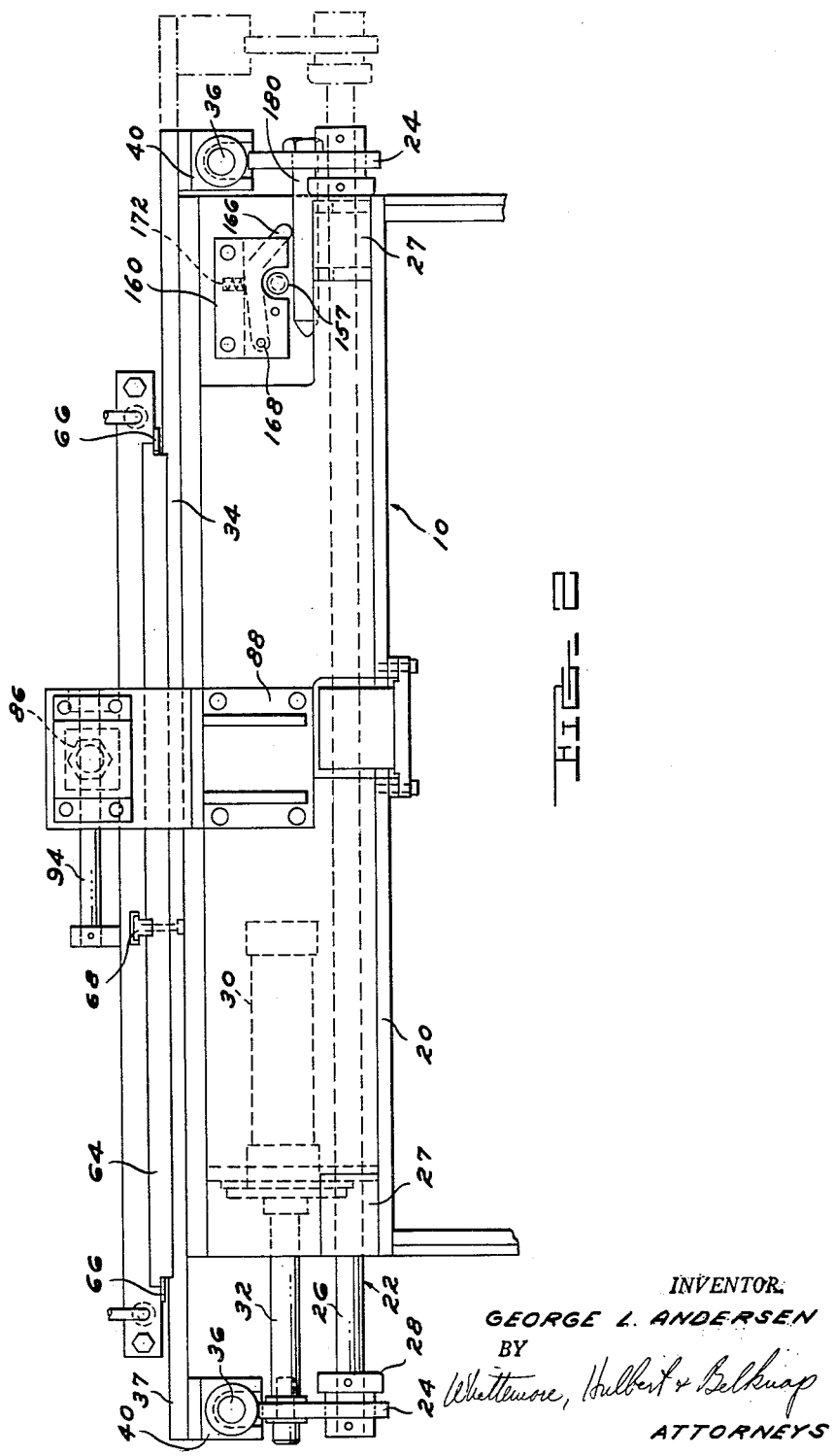

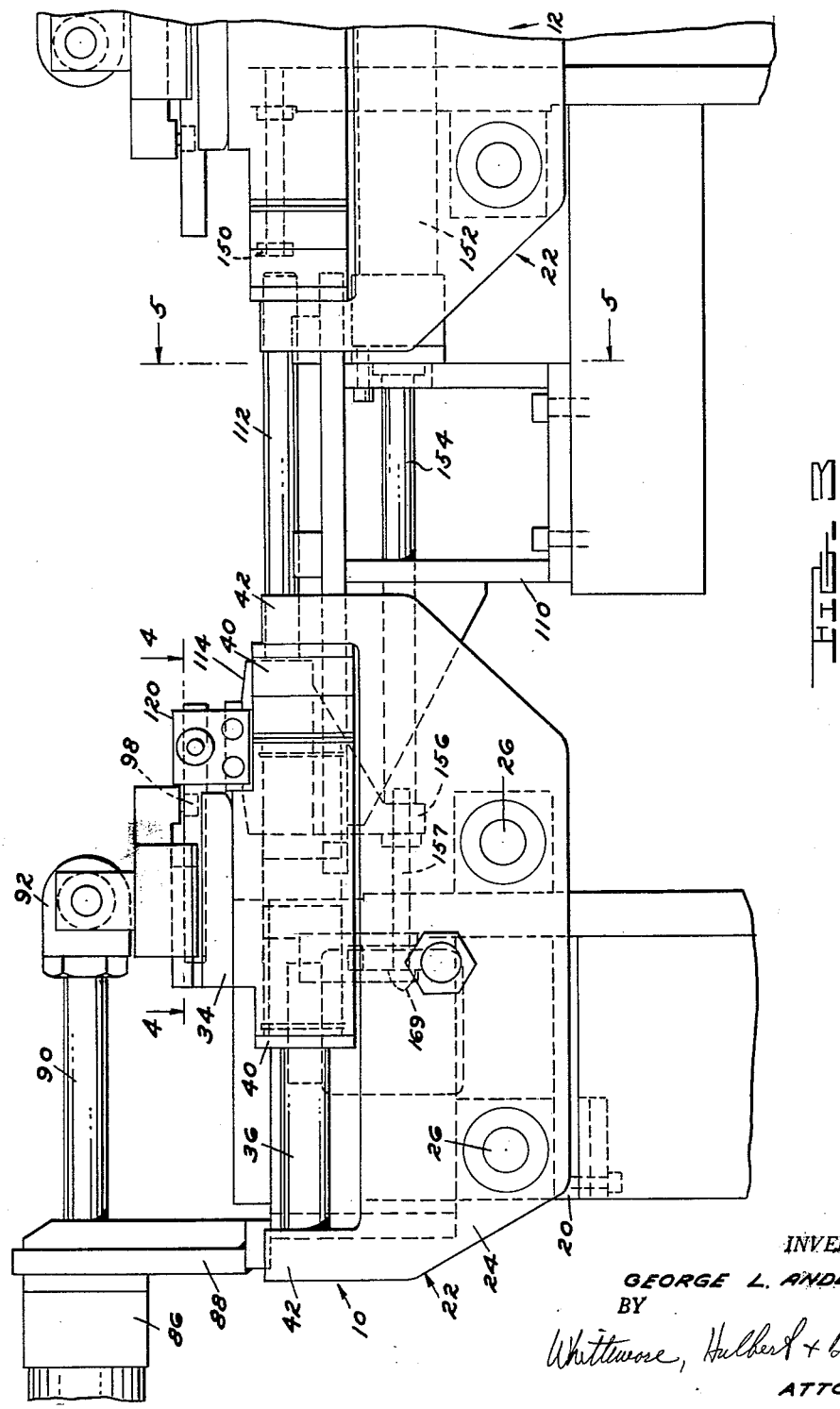

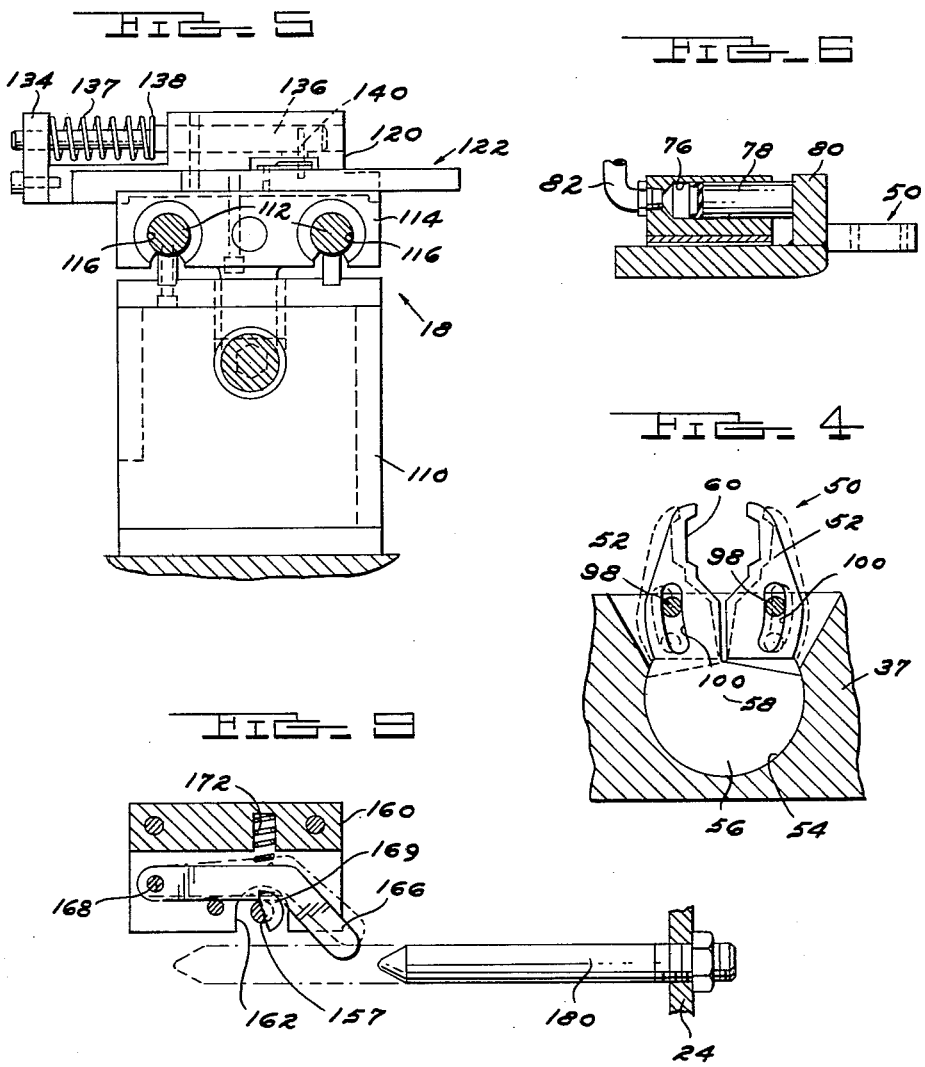

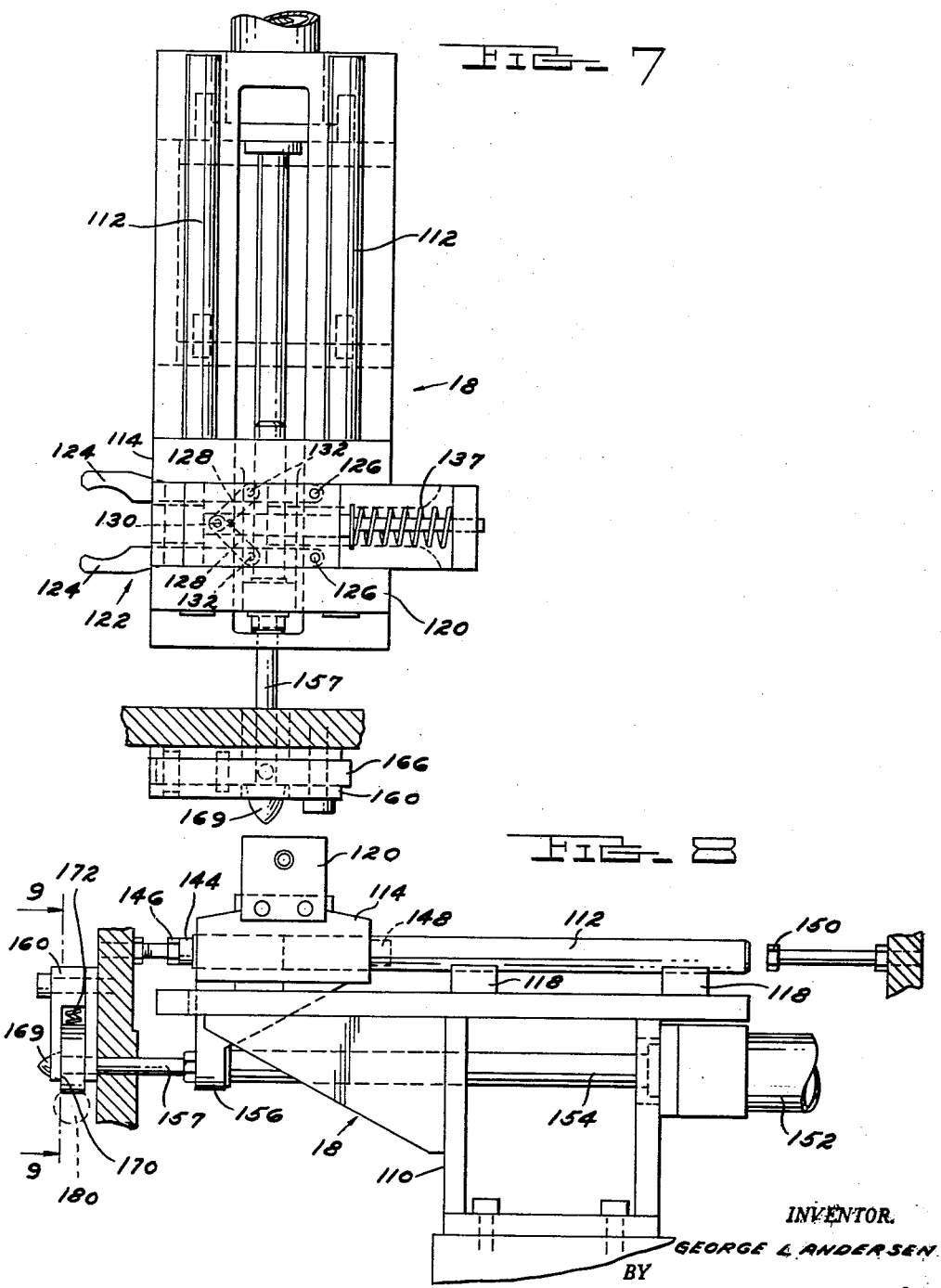

3,143,217
TRANSFER MECHANISM
George L. Andersen, Birmingham, Mich., assignor, by mesne assignments, to Avis Industrial Corporation, Roseville, Mich., a corporation of Michigan
Filed Jan. 16, 1961, Ser. No. 82,789
6 Claims. (Cl. 214—1)

This invention relates generally to transfer mechanism, and refers more particularly to mechanism for transferring work pieces from one work station to another.

One object of the invention is to provide transfer mechanism which is both fast and efficient and capable of gently and accurately positioning the work pieces at the respective stations.

Another object of the invention is to provide mechanism in which a clamp is provided having cooperable jaws relatively movable to grip and release a work piece, with means for relatively moving the jaws to release position slowly at first to gently and accurately release the work piece and thereafter rapidly to full release position.

Another object of the invention is to provide transfer mechanism including a slide guided for movement to the work station and having a clamp for carrying a work piece, with cam means carried by the slide for movement relative thereto and designed to provide the slow and gentle initial release of the work piece for accuracy and thereafter the relatively rapid movement of the clamp jaws to full release position. Preferably, a power device is provided connected to the cam means for moving the same, with a yieldable connection between the slide and the cam means opposing relative movement therebetween to effect movement of the slide to the work station by the power device, the yieldable connection thereafter permitting the cam means to move relative to the slide and thereby effect operation of the clamp jaws.

Another object of the invention is to provide transfer mechanism comprising a carriage longitudinally reciprocable between limits registerable with spaced work stations, and a slide carried by the carriage for reciprocation transversely of the path of the carriage toward and away from a position in which a clamp carried by the slide registers with the respective stations at the limits of reciprocation of the carriage. In accordance with this general construction, the slide may move in and out to grip and release work pieces, and between the in and out movements of the slide the carriage may move longitudinally to transfer work pieces from one station to the next.

Another object of the invention is to provide transfer mechanism including a pair of work transfer devices respectively associated with first and second work stations, in which the first carrier is provided to transfer a work piece from its work station and the second carrier is provided to transfer a work piece to its work station, having a cross slide movable between the stations for transferring a work piece from the second station to the first. Preferably, means are provided for moving the cross slide from the first station to the second at a high rate of speed in response to initial movement of the carriers so that the cross slide arrives at the second station before the second carrier and is thus in position to receive the work piece delivered thereby.

Another object of the invention is to provide transfer mechanism in which two laterally spaced rows of stations are provided with a device to one side of each row of stations for transferring work pieces from one station to the other, and having a cross slide at one end of the rows for transferring a work piece from an end station of one row to an end station of the other.

Other objects and features of the invention will become apparent as the description proceeds, especially when taken in conjunction with the accompanying drawings, illustrating a preferred embodiment of the invention, wherein:

FIGURE 1 is a fragmentary top plan view of apparatus embodying my invention.

FIGURE 2 is a side elevational view of the apparatus shown in FIGURE 1.

FIGURE 3 is an end elevational view of the apparatus shown in FIGURE 1.

FIGURE 4 is a sectional view taken on the line 4—4 of FIGURE 3.

FIGURE 5 is a sectional view taken on the line 5—5 of FIGURE 3.

FIGURE 6 is a sectional view taken on the line 6—6 of FIGURE 1.

FIGURE 7 is a top plan view illustrating the cross slide.

FIGURE 8 is an elevational view of the cross slide shown in FIGURE 7.

FIGURE 9 is a sectional view taken on the line 9—9 of FIGURE 8.

Referring now more particularly to the drawings, and especially to FIGURES 1–3 thereof, the transfer mechanism includes a pair of like transfer devices 10 and 12 which are opposed to one another as will be apparent from FIGURE 1. The transfer device 12 is only fragmentarily shown because a description of the device 10 will suffice for both.

In general, the transfer device 10 is provided for moving work pieces step by step along the row of equally spaced stations 14, and the transfer device 12 is provided to transfer work pieces step by step along the row of equally spaced stations 16. The row of work stations 14 lies in a straight horizontal line parallel to the row of work stations 16. Thus, the work pieces are moved along the row of work stations 16 from left to right and then are transferred to the row of work stations 14 by the cross slide 18, whereupon the work pieces are transferred step by step from one to the other of the work stations 14. A device such as this may be employed, for example, in instances where it is desired to progressively shape a work piece to a final configuration in a series of forming operations. In other words, mechanism may be employed at each station for progressively forming the work piece, and between operations the work piece may be transferred from one station to the next. The transfer devices are capable of simultaneously transferring all of the work pieces from station to station.

The transfer device 10 has a supporting frame 20. Mounted on frame 20 is a carriage 22 which moves parallel to the row of work stations 14. Specifically, the carriage comprises the end frame members 24 which are connected together by the horizontal parallel rods 26, the rods 26 being slidably supported for movement in bushings 27 on the supporting frame 20. Each rod 26 carries near the end frame members 24 a stop 28 which is engageable with the adjacent end portion of the fixed frame 20 to determine the limits of reciprocation of the carriage. The carriage is shown at one limit of its movement in FIGURES 1 and 2, and at its opposite limit in FIGURES 1 and 2, and at its opposite limit in dotted lines in FIGURE 2.

Means are provided for reciprocating the carriage comprising a cylinder 30 rigidly secured to the fixed frame 20 and disposed with its axis parallel to the direction of movement of the carriage. A piston (not shown) is disposed within the cylinder for sliding movement, and a piston rod 32 extending from the piston is rigidly connected to one frame member 24 of the carriage. The cylinder 30 is double-acting and fluid under pressure is alternately admitted to and exhausted from the ends of the cylinder to reciprocate the carriage. The stops 28 on the carriage stroke equal to the distance between stations 14 for reasons which will appear more fully hereinafter.

A clamp slide 34 is mounted on the carriage for reciprocation in a direction at right angles to the path of movement of the carriage. Referring particularly to FIGURES 1–3, it will be noted that each frame member 24 of the carriage has a horizontal rod 36 which is at right angles to the path of reciprocation of the carriage, the rods being parallel to one another. The slide has a horizontal table 37 and at each end is provided with elongated sleeves 40 which slidably receive the rods 36 and thereby provide for sliding movement of the slide relative to the carriage in a transverse direction. As noted in FIGURES 1 and 3, at each end of the rods 36 an enlarged stop 42 is provided, the stops being engageable with sleeves 40 to determine the limits of reciprocation of the slide.

Referring to FIGURES 1, 3 and 4, it will be noted that the slide 34 carries a plurality of clamps 50 which are spaced apart longitudinally; that is, in the direction of the row of stations 14, the spacing between the clamps 50 being equal to the spacing between the stations. Each clamp has a pair of jaws 52 which are supported in recesses 54 in the table 37 of the slide. As shown particularly in FIGURE 4, the inner ends of the jaws are formed with semi-circular mounting portions 56 which fit in the circular recesses 54 so that they may rotate about the center axis 58 of the recess. One mounting portion 56 of one jaw overlies the mounting portion of the other within the recess. The outer portions of the jaws are formed with complementary gripping surfaces 60 which cooperated to engage and grip a work piece. It will be understood that other gripping surface formations may be employed, and in fact, special adapters may be attached to the gripping surfaces depending upon the particular configuration of the work pieces involved.

The jaws are moved to gripping and release positions by a cam arrangement including a support 62 which is mounted on the clamp slide for movement relative thereto in the direction of movement of the slide. Referring particularly to FIGURE 2, it will be seen that the table 37 of the clamp slide has a platen 64 for mounting the support, and the cam support overhangs the platen at each end, having a key 66 which fits under a shoulder of the platen to prevent the two from separating. It will also be noted in FIGURE 2 that another key 68 is provided intermediate the ends of the platen which projects into a dovetailed recess in the support to provide additional guidance for the movement of the support 62 relative to the slide. Additional keys 68 may be provided between the ends of the platen, as desired. Guide pins 70 are also provided, being mounted at their inner ends on upright extensions 72 of the slide, the pins 70 extending parallel to the direction of movement of the support 62 relative to the clamp slide and being received in suitable bores of the support.

Normally, the cam support 62 is in a retracted or outer position relative to the clamp slide 34; that is, it is moved from the position shown in FIGURE 3 to the left relative to the slide in which position it is engaged by the stops 74 (FIGURE 1) on the rods 70 which provide a limit of retraction for the support.

As shown in FIGURES 1 and 6, the support is formed with the bores 76 at either end, which are open at their inner ends to receive plungers 78 rigidly carried by upright extensions 80 of the slide. The plungers are freely slidable within the bores, and air under pressure is admitted to the bores at the closed opposite ends thereof by means of the fluid connections 82. The fluid under pressure within the bores acting on the plungers provides a means for yieldably and resiliently holding the support 62 in a retracted position against stops 74.

Means are provided for advancing the cam support 62 to the "in" position illustrated in FIGURES 1 and 3 against the action of the fluid pressure in bores 76, and such means is illustrated in FIGURES 1–3. As there shown, a cylinder 86 is rigidly secured to the fixed frame 20 by a mounting 88, the axis of the cylinder being parallel to the direction of movement of the support 62 relative to slide 34. The cylinder has a piston (not shown) slidable therewithin, and a rod 90 extending from the piston has attached to its forward end a coupling 92. The coupling 92 slidably receives a rod 94 which is carried by support 62 and is disposed in a direction parallel to the direction of movement of carriage 22. Hence, the cylinder 86 is operative to move the cam support 62 relative to the clamp slide irrespective of the position of the carriage 22 which supports the same.

Referring now to FIGURES 3 and 4, it will be seen that the cam support 62 carries a pair of cam followers 98 associated with each clamp 50. As shown in FIGURE 4, the followers of each pair respectively engage in arcuate slots 100 formed in the jaws of each clamp to determine the position of the work piece engaging surfaces thereof. When the support 62 is retracted relative to slide 34, the followers engage in the outer ends of the slots as shown in dotted lines in FIGURE 4 in which case the jaws are likewise in the dotted line or release position. When the support 62 is moved inwardly, the followers engage the inner ends of the slots as shown in solid lines, in which event the engaging surfaces of the jaws move toward one another to solid line gripping position. The cam slots are so formed that when the followers move outwardly relative thereto at a uniform rate, the jaws initially move relatively slowly to release position, thereby gently and accurately disengaging the work piece, and thereafter they continue to move to full release position relatively rapidly to conserve time.

To summarize the description of the transfer device 10, it comprises a carriage 22 which is movable longitudinally of the row of stations 14, the stroke or length of movement of the carriage being equal to the spacing between the stations. The carriage supports a clamp slide 34 which moves transversely of the carriage from an inner position as illustrated in which the clamps register with the respective work stations, to an outer position in which the clamps are spaced laterally outwardly from the row of work stations. The cam support 62 moves relative to the clamp slide. In its inner position it moves the jaws of the clamp to gripping position and in its outer position it releases the jaws.

In operation, the cylinder 86 is first operated to move the cam support 62 and clamp slide 34 inwardly to a position in which the jaws register with the respective work stations. The resilient connection between the two, provided by air under pressure in the bores 76, causes the clamp slide to move as a unit with the cam support until the clamp slide reaches its inner limit, whereupon the cam support continues to move inwardly thereby urging the jaws of the respective clamps to gripping position. The work pieces thus gripped by the jaws are then transferred to the next station by the operation of cylinder 30 to advance the carriage from the dotted line position of FIGURE 2 to the solid line position thereof. The cylinder 86 is again operated to retract the cam support 62; that is, to move it outwardly, during which time the work pieces are released because the clamp slide remains at its outer limit. When the cam support engages the stops 74 of the guide rods 70, it picks up the clamp slide and carries it to its outer position in which the clamps 50 are withdrawn laterally outwardly from the row of work stations. Thereafter, the cylinder 30 is again operated to return the carriage to the dotted line position of FIGURE 2.

The transfer device 12 is substantially identical with the transfer device 10 and is therefore illustrated only fragmentarily. During the time that the clamp slide and cam support of the transfer device 10 are moved inwardly, the clamp slide and cam support of the device 12 are also moved inwardly. However, at the same instant that the carriage 22 is moved to the left in FIGURE 1 to transfer the gripped work pieces one station, the carriage of the transfer device 12 is moved in the opposite direction to transfer its gripped work pieces one station. Hence, the step by step movement of work pieces along the row of stations 14 is in one direction and the step by step transfer of the work pieces along the row of stations 16 is in the opposite direction. The outward movement of the clamp slide and cam support are the same for both transfer devices. However, the carriage of transfer device 12 is returned to its starting position by a retraction movement to the left at the same time that the carriage 22 of transfer device 10 moves to the right.

A cross slide 18 is provided for transferring work pieces from the row of stations 16 to the row of stations 14. The cross slide is located at the right end of the transfer devices 10 and 12, as viewed in FIGURE 1. The cross slide comprises a fixed frame 110 which supports a pair of tracks in the form of horizontal guide bars 112 which extend parallel to one another and at right angles to the paths of movement of the carriages 22 of the two transfer devices 10. The guide rods 112 support the movable carrier 114 which, as shown in FIGURE 5, is formed with elongated open-ended bores 116 to slidably receive the rods 112. The lower sectors of the bores are open to clear the standards 118 for the bars.

The carrier supports the clamp housing 120. A clamp 122 is carried in the housing, comprising a pair of like opposed jaws 124. The jaws are pivotally supported within recesses in the housing for movement about axes defined by vertical pins 126. The jaws are capable of a limiting movement toward and away from each other. As shown in FIGURE 7, the links 128 have their adjacent ends pivoted together at 130 and their remote end respectively pivoted to the jaws at 132. Referring to FIGURE 5, it will be seen that the clamp housing 120 has an upright extension 134 which slidably receives the reduced end of a rod 136 slidable in the upper portion of the clamp housing. A coil spring 137 surrounds the reduced portion of the rod, being compressed between extension 134 and washer 138 which bears against the shoulder between the reduced and enlarged portions of the rod. The spring tends to urge the rod to the right as viewed in FIGURE 5. The rod carries a vertical pin 140 which connects with the pivoted ends of the links 128. Hence, the rod 136 through pin 140 tends to urge the jaws of the clamp 122 toward each other to grip a work piece. The jaws of the clamp can be spread apart to release a work piece against the action of the spring. The work engaging surfaces of the jaws are arcuate and thus formed to grip a work piece and to prevent a work piece from accidentally being withdrawn endwise from the clamp.

The carrier 120 is slidable on the guide rods 112 between limits in which the clamp 122 is respectively in register with one row of stations or the other. At one limit, the abutment 144 engages stop 146 and at the other limit abutment 148 engages stop 150. The carrier is reciprocated by a cylinder 152 which has a piston (not shown) therein to which is joined a connecting rod 154 connected at its opposite end to the depending extension 156 of the carrier 114. The cylinder is double-acting and is operative to move the carrier in both directions.

A latch device is provided for releasably holding the carrier in the dotted line position of FIGURE 1 in which the clamp registers with the row of stations 14. Referring more particularly to FIGURES 1, 2, 7, 8 and 9, it will be seen that the depending portion 156 of the carrier has a pin 157 rigidly secured thereto and projecting in the direction of movement of the carrier toward the transfer device 10. The transfer device 10 has a latch housing 160 secured to the fixed frame thereof which is formed with a recess 162 aligned with pin 157 and shaped to clear the same. A catch 166 is pivoted at one end by the pin 168 within the housing 160 for vertical swinging movement across the recess 162. It will be noted that the end of the pin is in the form of a tapered head 169 which is enlarged relative to the pin to provide a shoulder 170 immediately behind the head. A coil spring 172 carried in the housing presses down on the catch so that when the head of pin 157 projects through the recess, the catch can engage behind shoulder 170 and thereby positively prevent the carrier 114 from moving from a position of alignment with the row of stations 14.

The carriage 22 of transfer device 10 carries a release pin 180 which is rigidly secured to the end frame member 24 thereof, and which extends therefrom in the direction of reciprocation of the carriage. The pin 180 is positioned so that it will engage the depending end of catch 160 when the latter is in engagement with the head of pin 157 of the cross slide carrier. The forward end of pin 180 is tapered so that upon movement of the carriage 22 to the left in FIGURES 1 and 9, the pin 180 will cam the catch to the dotted line position of FIGURE 9, releasing pin 157 and permitting the carrier to move from its position of alignment with the row of stations 14.

In operation, let it be assumed that the carriages 22 of the transfer devices are at their opposite limits; that is, the carriage of the transfer device 10 is to the right of the position shown in FIGURE 1 and the other carriage is to the left of the position shown. Let it further be assumed that the clamp slides 34 of the respective transfer devices are in their outer positions in which the clamps are spaced laterally outwardly from the row of work stations. Let it further be assumed that the cross slide is in the dotted line position of FIGURE 1 in which the latch 166 engages the pin 157 and positively opposes movement of the cross slide from the dotted line position.

The cylinders 86 will first be actuated to move the clamp slides 34 to their inner limits, shown in FIGURE 1, this action being effected through the yieldable connections of the clamp slide with the cam supports 62. At the same time, fluid under pressure may be admitted to one end of the cylinder 152 of the cross slide to urge it from the position of alignment with the row of stations 14 to a position in register with the row of stations 16. Such movement is, however, prevented by the latch 160. The operation of the cylinders 86 and 152 may for example take place upon the upward or retraction movement of a ram which carries work-forming devices that have completed a work-forming stroke upon work pieces at the respective stations and is now being withdrawn. Such operation could be controlled by limit switches, for example.

When the clamp slides reach their inner limit, the fluid pressure in the bores 76 yields to permit a relative inward movement of the cam supports thereby constraining the jaws of the clamps to move together and grip a work piece at the associated station. Thereupon the cylinders 30 are operated to move the carriages 22, thereby advancing the clamps and work pieces gripped thereby to the next station. The carriage of transfer device 10 is moved to the left and the carriage of transfer device 12 is moved to the right (FIGURE 1). The initiation of the movement of the carriages might take place through limit switches operated by the cam supports upon their arrival at the forward limit of relative movement thereof.

During the initial movement of carriage 22 of transfer device 10 to the right, the pin 180 thereof engages catch 160 to release the carrier 114 of the cross slide thereby permitting the cross slide to move rapidly under fluid pressure to the solid line position of FIGURE 1 in register with the row of stations 16. The carrier of the cross slide is very light in comparison with the carriage and associated structure of the transfer devices 10 and 12, and therefore the carrier 114 moves very rapidly to the solid line position of FIGURE 1, and in fact arrives at such position before the carriage of transfer device 12 reaches its limit, illustrated in FIGURE 1.

Therefore, the jaws of the cross slide are waiting for the work piece which is being transferred by the endmost clamp of the carriage of transfer device 12. Since the jaws of the clamp of the cross slide are resiliently mounted, they will yield to allow the work piece to be forced therebetween by the jaws of the clamp on the transfer device 12.

When the carriages 22 of the transfer devices reach their respective advanced positions, they may operate limit switches to reverse the cylinders 86, effecting an outward movement of the clamp slides preceded of course by a relative outward movement of the cam supports so that the work pieces are first released. The cam followers and grooves 100 are so shaped that the initial relative outward movement of the cam supports and their followers provides a very slow and gentle release of the transferred work pieces and, after initial release of the work pieces, the jaws move outwardly very rapidly. In accordance with this construction, the work pieces are gently and very accurately released, but the subsequent rapid movements of the jaws to full release position is extremely fast to conserve time.

Upon the full withdrawal of the clamp slides to their outer limits, the carriages 22 are then retracted to their starting positions, that is, the carriage of transfer device 10 is moved to the right and the other carriage to the left. This is accomplished by reversing the cylinders 30 which action may be initiated by limit switches operated in response to the movement of the clamp slides to their outer limits. At the same time, the cylinder 152 may be reversed to return the carrier of the cross slide to its position of register with the row of stations 14. The clamp of the carrier will of course carry with it a work piece received from the end clamp of the transfer device 12. Then when another cycle begins, the work piece held by the clamp of the cross slide will be picked up and transferred to the next station by the inward movement and subsequent longitudinal advance of the transfer device 10. The jaws of clamp 122 are of course yieldable to permit this.

The work pieces in the row of stations 16 have thus been moved one station to the right and the endmost work piece has been transferred from the row of stations 16 to the row of stations 14 where it is held by the clamp of the carrier of the cross slide in the dotted line position of FIGURE 1. The work pieces of the row of stations 14 have likewise been moved one station. The foregoing cycle will thereafter be followed to continue the advancement of the work pieces one station at a time. Between each cycle of operation of the transfer devices, a ram carrying work-forming tools associated with each station may be operated to progressively form the work pieces at the respective stations. In this way work pieces may be progressively formed to final configuration in a series of operations.

The drawings and the foregoing specification constitute a description of the improved transfer mechanism in such full, clear, concise and exact terms as to enable any person skilled in the art to practice the invention, the scope of which is indicated by the appended claims.

What I claim my invention is:

1. Mechanism for advancing workpieces step-by-step along a row of equally spaced stations comprising a fixed support adjacent said stations, a carriage mounted on said support for reciprocation along a path substantially parallel to said row of stations, means for reciprocating said carriage through a stroke equal to the spacing between stations, a clamp slide mounted on said carriage for reciprocation transversely of the path of said carriage to and from an advance position, a plurality of clamps mounted on said slide, said clamps being spaced apart in the direction of carriage reciprocation the same distance as said stations, said clamps in the advance position of said slide registering with said stations at one end of the carriage stroke and advancing a station at the other end of the stroke, a device adapted to be advanced and retracted in the direction of reciprocation of said slide and operative to cause said clamps to grip when advanced relative to said slide and to release when retracted relative to said slide, power means for reciprocating said device relative to said slide, a lost motion connection between said device and slide to reciprocate said slide by the reciprocation of said device, said power means being mounted on said fixed support, and a sliding connection between said power means and said device enabling the reciprocation of said device by said power means in any position of said carriage.

2. The mechanism defined in claim 1, wherein said sliding connection includes an elongated member on said device extending in the direction of carriage movement, and a coupling on said power means slidably connected to said elongated member.

3. The mechanism defined in claim 2, wherein said clamps include cooperable jaws relatively movable toward and away from each other between gripping and releasing positions, said device including followers engageable with cams on said jaws, a support for said followers mounted on said slide for movement in the direction of reciprocation of the latter, said elongated member being connected to said last-mentioned support.

4. Mechanism for advancing workpieces step-by-step along a row of equally spaced stations comprising a fixed support adjacent said stations, a carriage mounted on said support for reciprocation along a path substantially parallel to said row of stations, means for reciprocating said carriage through a stroke equal to the spacing between stations, a clamp slide mounted on said carriage for reciprocation transversely of the path of said carriage to and from an advance position, a plurality of clamps mounted on said slide, said clamps being spaced apart in the direction of carriage reciprocation the same distance as said stations, said clamps in the advance position of said slide registering with said stations at one end of the carriage stroke and advancing a station at the other end of the stroke, said clamps including cooperable jaws relatively movable toward and away from each other between gripping and releasing positions, cams on said jaws, followers respectively engageable with said cams, a support for said followers mounted on said slide for advance and retraction in the direction of reciprocation of said slide, said cams being so formed that upon advance of said support relative to said slide in the direction of advance of the latter said jaws are relatively moved from release to gripping position, power means for reciprocating said follower support in the direction of reciprocation of said slide, yieldable means between said slide and follower support opposing the advance of said support relative to said slide to effect movement of said slide to its advance position when said follower support is advanced initially by said power means, stop means determining said advance position of said slide, said yieldable means thereafter yielding to permit the further advance of said follower support relative to said slide and corresponding movement of said clamp jaws toward one another to gripping position, said yieldable means holding said slide in its advance position during initial retraction of said follower support by said power means to move said jaws apart by the action of said followers on said cams, and means on said follower support engageable with said slide to retract said slide during the further retraction of said support by said power means.

5. The mechanism defined in claim 4, wherein said follower support has an elongated member extending in the direction of carriage movement, said power means is mounted on said fixed support, and a coupling on said power means slidably connected to said elongated member.

6. Mechanism for advancing workpieces between spaced stations comprising a fixed support adjacent said stations, a carriage mounted on said support for reciprocation alongside said stations, means for reciprocating said carriage through a stroke equal to the spacing between said stations, a clamp slide mounted on said carriage for reciprocation transversely of the path of said carriage to and from an advance position, a clamp mounted on said slide, said clamp in the advance position of said slide registering with one station or another at the ends of the carriage stroke, a device adapted to be advanced and retracted in the direction of reciprocation of said slide and operative to cause said clamp to grip when advanced relative to said slide and to release when retracted relative to said slide, power means for reciprocating said device relative to said slide, a lost motion connection between said device and slide to reciprocate said slide by the reciprocation of said device, said power means being fixed relative to said fixed support, and a sliding connection between said power means and said device enabling the reciprocation of said device by said power means in any position of said carriage.

References Cited in the file of this patent

UNITED STATES PATENTS

| | | |
|---|---|---|
| 1,575,185 | Stenhouse | Mar. 2, 1926 |
| 1,933,225 | Smith | Oct. 31, 1933 |
| 2,121,025 | Egger | June 21, 1938 |
| 2,332,058 | Cattonar | Oct. 19, 1943 |
| 2,575,123 | Pollard | Nov. 13, 1951 |
| 2,894,616 | Young | July 14, 1959 |
| 2,901,126 | Halberstadt | Aug. 25, 1959 |
| 2,906,416 | Yeo | Sept. 29, 1959 |
| 2,909,265 | De Buigne | Oct. 20, 1959 |
| 2,929,485 | Wallis | Mar. 22, 1960 |
| 2,934,194 | Adams | Apr. 26, 1960 |
| 2,998,887 | Sommer | Sept. 5, 1961 |
| 3,010,371 | Riedel | Nov. 28, 1961 |
| 3,013,835 | Blatt | Dec. 19, 1961 |